Patented Aug. 24, 1954

2,687,419

UNITED STATES PATENT OFFICE 2,687,419

2,3,4,5-BIS ($\Delta^2$-BUTENYLENE)-TETRAHYDROFURFURYL ALCOHOLS

John C. Hillyer, Bartlesville, Okla., assignor to Phillips Petroleum Company, a corporation of Delaware No Drawing. Application November 8, 1951, Serial No. 255,520

6 Claims. (Cl. 260—346.2)

This invention relates to novel compositions of matter. More particularly, this invention relates to polycyclic alcohols.

In one aspect this invention relates to 2,3,4,5-bis($\Delta^2$-butenylene) tetrahydrofurfuryl alcohol.

I have now discovered novel, polycyclic alcohols. The novel compounds of this invention can be represented by the general formula

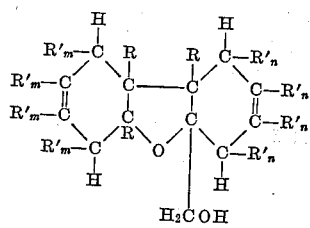

wherein each R is of the group consisting of hydrogen and methyl and at least one R is hydrogen, and each R' is of the group consisting of hydrogen and an alkyl group having not more than 3 carbon atoms with the sum of the carbon atoms in the R'$_m$ and in the R'$_n$ in each case, not greater than three and at least two of the R'$_m$ and of the R'$_n$ are hydrogen. These novel alcohols are soluble in most of the common solvents such as benzene, isopentane, n-pentane, n-heptane, methanol, ethanol and others.

The compounds of this invention can be prepared by the reduction of the corresponding aldehydes by suitable means, such as by a crossed Cannizzaro reaction. Polycyclic aldehydes from which the materials of this invention can be prepared are fully described in the patent application of J. C. Hillyer et al., Serial No. 81,413, filed March 14, 1949, the disclosures of which are incorporated into and made a part of this disclosure. This patent also describes a method for the production of said aldehydes.

The polycyclic aldehydes from which the novel polycyclic alcohols of this invention are prepared are obtained by reacting a suitable diolefin with a suitable furfural. As the diolefin reactant it is preferred to use a conjugated diolefin, preferably a conjugated diolefin having not more than about 7 carbon atoms per molecule. Such a diolefin can be referred to as a member of the group consisting of 1,3-butadiene and its immediate homologues and may be reported as having the formula

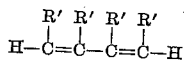

wherein each R' is of the group consisting of hydrogen and an alkyl group having not more than three carbon atoms and wherein at least two R' are hydrogen atoms. The furfural reactant employed in the practice of this invention can be referred to as one of the group consisting of furfural and its immediate homologues having not more than six carbon atoms per molecule, such as an alkyl substituted furfural having not more than six carbon atoms per molecule. Such material may be represented by the general formula

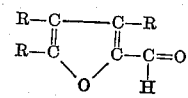

wherein each R is of the group consisting of hydrogen and a methyl group and wherein at least one R is a hydrogen atom. The more commonly used reactants employed as starting materials in the production of the polycyclic aldehydes prior to the preparation of the novel polycyclic alcohols of this invention therefrom include 1,3-butadiene and furfural, isoprene and furfural, piperylene and furfural and the corresponding diolefins with a methyl furfural. It appears that in producing the raw material polycyclic aldehyde, two molecules of the diolefin react with one molecule of the furfural reactant by a modification of the Diels-Alder reaction.

The compounds of this invention have many potential uses as chemical intermediates and they are useful as hypergolic fuels and as softeners for natural and synthetic rubbers. Other uses of the materials of this invention appear to be as a lubricating oil additive, as a wax modifier, as a selective solvent modifier and as an additive for insecticidal compositions. When employed as rubber softeners the novel alcohols of this invention can be used alone or as mixtures with each other or in conjunction with other softeners. The amount employed will vary depending upon the type of rubber stock being processed and the properties desired in the finished product. The amount employed will usually be in the range of 1 to 50 parts per hundred parts of rubber and more frequently in the range of 3 to 25 parts per hundred parts of rubber. Synthetic rubbers with which the novel alcohols may be incorporated as softeners include 1,3-butadiene-styrene copolymer, polybutadiene, polyisobutene, polychloroprene and the like.

Typical novel polycyclic alcohols of this invention are 2,3,4,5 - bis($\Delta^2$ - butenylene) - tetrahydrofurfuryl alcohol, 3-methyl-2,3,4,5-bis($\Delta^2$-butenylene) - tetrahydrofurfuryl alcohol, 4-methyl - 2,3,4,5 - bis(3-methyl-$\Delta^2$-butenylene)-tetrahydrofurfuryl alcohol, 3,5-dimethyl-2,3,4,5-bis(2,3, dimethyl - $\Delta^2$ - butenylene) - tetrahydrofurfuryl alcohol, 2,3(2 - isopropyl - $\Delta^2$-butenylene) - 4,5(4-methyl-$\Delta^2$-butenylene)-tetrahydrofurfuryl alcohol, and 5) - methyl - 2,3(2-methyl - $\Delta^2$-butenylene) -4,5- (2-ethyl-$\Delta^2$-butenylene) -tetrahydrofurfuryl alcohol as well as their higher and lower molecular weight homologues. A particularly preferred polycyclic alcohol is 2,3,4,5 - bis($\Delta^2$ - butenylene)-tetrahydrofurfuryl alcohol.

The following examples presented below are illustrative of this invention, the novel polycyclic alcohols, their method of preparation and uses.

EXAMPLE I

*Preparation of 2,3,4,5-bis($\Delta^2$-butenylene)-tetrahydrofurfuryl alcohol*

A run was made wherein 250 grams of potassium hydroxide was dissolved in 375 ml. of methyl alcohol and the solution so formed added with stirring over a period of 30 minutes to 306 grams of 2,3,4,5-bis($\Delta^2$-butenylene)-tetrahydrofurfural, said 2,3,4,5-bis($\Delta^2$-butenylene)-tetrahydrofurfural being dissolved in 150 ml. of 40 weight per cent aqueous formaldehyde and 400 ml. of methyl alcohol. Temperature of the reaction mixture during said addition was maintained at about 60° C. for 3 hours after the addition was completed. Methanol was removed by vacuum distillation and 450 ml. of water was then added. Phase separation occurred, the bottom layer being the aqueous layer. The top layer, containing most of the product, was removed. The bottom layer was extracted with three 200 ml. portions of benzene. The benzene extract and the top layer were combined and washed with five 50 ml. portions of water. Benzene was removed by vacuum distillation to provide 275.1 grams of crude 2,3,4,5-bis($\Delta^2$-butenylene)-tetrahydrofurfuryl alcohol. The crude alcohol was a light yellow, viscous liquid which slowly crystallized on standing at room temperature (25° C.).

The crude product was distilled under vacuum to provide pure 2,3,4,5-bis($\Delta^2$-butenylene)-tetrahydrofurfuryl alcohol which was a white crystalline solid having a melting point of 33 to 35° C., refractive index $n_D^{20}$ 1.5335, and a hydroxyl number of 259. The pure product was readily soluble in benzene, isopentane, n-pentane, n-heptane, methanol, and ethanol. The 2,4-dinitrobenzoate derivative of said 2,3,4,5-bis($\Delta^2$ - butenylene) - tetrahydrofurfuryl alcohol had a melting point of 75–77° C.

EXAMPLE II 2,3,4,5 - bis($\Delta^2$-butenylene)-tetrahydrofurfuryl alcohol was evaluated as a softener in a 74/26 1,3-butadiene-acrylonitrile copolymer prepared by emulsion polymerization. The following compounding recipes were employed, I having a softener loading of 10 parts softener per 100 parts of rubber and II having a softener loading of 20 parts softener per 100 parts of rubber.

|  | Parts by weigh | |
|---|---|---|
|  | I | II |
| 1,3-butadiene-acrylonitrile copolymer | 100 | 100 |
| Philblack A [1] | 60 | 60 |
| Zinc oxide | 5 | 5 |
| Altax [2] | 1.5 | 1.5 |
| Stearic Acid | 1.5 | 2.0 |
| Sulfur | 1.5 | 1.75 |
| Softener | 10 | 20 |

[1] Medium abrasion furnace black.
[2] Benzothiazyl disulfide.

The samples were compounded and cured at 307° F. for 30 minutes. The results obtained are set forth in Table No. 1.

Table No. 1

| Softener | PHR [1] Softener | 80° F. | | | Shore Hardness | Percent Compression Set | Mooney [2] Valve |
| --- | --- | --- | --- | --- | --- | --- | --- |
| | | 300% Modulus, p.s.i. | Tensile p.s.i. | Percent Elongation | | | |
| 2,3,4,5-bis($\Delta^2$ butenylene)-tetrahydrofurfuryl alcohol | 10 | 2,090 | 2,850 | 400 | 64 | 12.2 | 44.5 |
| | 20 | 1,850 | 2,750 | 420 | 59 | 14.1 | 34.5 |
| OVEN AGED 24 HOURS AT 212° F. | | | | | | | |
| 2,3,4,5-bis($\Delta^2$-butenylene)-tetrahydrofurfuryl alcohol | 10 | 3,250 | 3,250 | 300 | | | |
| | 20 | | 3,080 | 290 | | | |

[1] PHR—parts per 100 parts of rubber.
[2] Compounded Mooney value—small rotor for 1— minutes at 212° F. according to ASTM-D927-49T.

Many substitutions, modifications and improvements may be made by those skilled in the art upon reading this disclosure without departing from the spirit or scope of this invention.

I claim:

1. A polycyclic alcohol represented by the general formula:

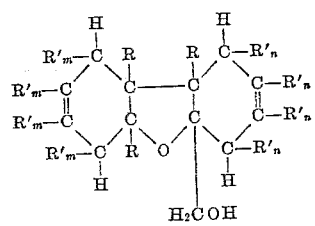

wherein R is selected from the group consisting of hydrogen and methyl radical, wherein at least one R is hydrogen, wherein each R' is selected from the group consisting of hydrogen and an alkyl radical having not more than 3 carbon atoms and wherein the sum of the carbon atoms in the R'$_m$ and in the R'$_n$ in each case is not greater than 3 and wherein at least two of the R'$_m$ and at least two of the R'$_n$ are hydrogen.

2. 2,3,4,5 - bis($\Delta^2$ - butenylene) - tetrahydrofurfuryl alcohol.

3. 3-methyl - 2,3,4,5-bis($\Delta^2$-butenylene)-tetrahydrofurfuryl alcohol.

4. 4 - methyl - 2,3,4,5-bis(3 - methyl - $\Delta^2$-butenylene)-tetrahydrofurfuryl alcohol.

5. 3,5 - dimethyl - 2,3,4,5 - bis(2,3, dimethyl-$\Delta^2$-butenylene)-tetrahydrofurfuryl alcohol.

6. 2,3(2 - isopropyl - $\Delta^2$ - butenylene) - 4,5(4-methyl-$\Delta^2$-butenylene)-tetrahydrofurfuryl alcohol.

References Cited in the file of this patent

UNITED STATES PATENTS

| Number | Name | Date |
|---|---|---|
| 2,146,730 | Gilman et al. | Feb. 14, 1939 |
| 2,325,948 | Garvey | Aug. 3, 1943 |
| 2,483,903 | Herbolsheimer | Oct. 4, 1949 |
| 2,572,563 | Hillyer et al. | Oct. 23, 1951 |
| 2,572,577 | Tissol et al. | Oct. 23, 1951 |
| 2,610,116 | Goodhue et al. | Sept. 9, 1952 |